March 21, 1967  O. H. LINDEMANN  3,310,027

LIQUID COATING APPARATUS

Filed April 20, 1964  4 Sheets-Sheet 1

March 21, 1967 — O. H. LINDEMANN — 3,310,027
LIQUID COATING APPARATUS
Filed April 20, 1964 — 4 Sheets-Sheet 4

3,310,027
LIQUID COATING APPARATUS
Otto H. Lindemann, Buffalo, N.Y., assignor to Hooker Chemical Corporation, Niagara Falls, N.Y., a corporation of New York
Filed Apr. 20, 1964, Ser. No. 360,902
6 Claims. (Cl. 118—52)

This invention relates to an apparatus for applying liquid coatings to articles and subsequently removing excess liquid coating therefrom. More particularly, this invention relates to an apparatus for applying a coating composition containing a volatile organic solvent to an article and subsequently removing excess coating composition from the article by means of centrifugal force.

Protective coatings have usually been applied to surfaces by one of several known coating techniques such as brushing, dipping, spraying, flow coating, electrostatic deposition and the like. In commercial operations, dip coating, flow coating, and spray coating have been used most extensively, primarily because of the rapid application means and adaptability to automated continuous coating operations.

Many different types of protective coatings have been applied by dipping, spraying, flow coating, and the like. Primarily, paints, enamels, lacquers, varnishes, and similar protective coatings are applied in this manner. The protective coating compositions are normally organic but often contain inorganic substituents such as pigments, fillers, and the like, in addition to volatile solvents. Frequently, the volatile or solvent portion of these compositions has been a flammable solvent such as toluene, xylene, mineral spirits, kerosene, alcohols, esters, such as ethyl acetate or naphtha. In recent years, appreciable quantities of protective coating compositions based on relatively nonflammable solvents, such as halogenated aliphatic hydrocarbons, have been used. These coating compositions have been found to be advantageous in that the fire hazards attendant the use of more flammable solvents are substantially eliminated. Moreover, with the substantially nonflammable solvents, hot application techniques may be used; thereby obtaining advantages of improved film characteristics, rapid application and fast solvent evaporation from the film.

Generally, protective coating compositions based on either the substantially nonflammable or the flammable solvents may be applied with equally good results using various coating methods such as dip coating, flow coating, spray coating, and the like. However, in some instances problems have developed in applying both types of compositions. Principally, these difficulties have been encountered in coating articles of intricate shapes, such as those containing apertures, cavities, indentations, interstices, recesses, and so on. When using spray coating techniques on such articles, it is often not possible to obtain complete coating coverage on all surfaces, particularly hidden surfaces within indentations and recesses. These difficulties may be overcome by using dip coating or flow coating techniques. Such methods provide the article with an excess of substantially liquid coating composition which flows into the areas to be coated, allowing the excess to drain from the article. This is where substantial difficulties are encountered.

It is difficult to completely remove the excess coating material from the article coated due to the entrapment of coating compositions within the recesses. It is, therefore, difficult to obtain a dry coating of substantially uniform thickness. In addition, the interstices and recesses cause dripping of the coating composition for an extended period of time thus slowing down production efficiency and resulting in excessive waste of coating composition.

It is an object of the present invention to provide an apparatus whereby a coating composition can be applied with substantial uniformity of thickness quickly and easily on an article without regard to its surface configuration. Another object of this invention is to provide an apparatus useful in carrying out the method of my copending application Ser. No. 303,436, filed August 20, 1963.

It is a further object of this invention to provide an apparatus whereby excess coating composition may be easily and quickly removed from the surface of an article, thereby substantially eliminating dripping of the coating composition, delay in production and waste of coating composition.

These and other objects will become apparent to those skilled in the art from the description of the invention.

The objects of this invention are accomplished by an apparatus comprising means for coating, means for conveying to and from said coating means, and means for spinning after coating at a peripheral speed sufficient to remove excess liquid coating vehicle.

The apparatus of this invention is briefly described as a means for insuring complete coating coverage of intrically shaped articles, the subsequent removal of excess coating vehicle and the recovery of the removed coating vehicle. This is accomplished by several steps, the first of which is rotating the article in the coating tank. Such rotation frees air bubbles entrapped among the intricate complexities of the article. The apparatus then causes the article to be quickly moved to a separate chamber in which the article is rotated or spun to remove the excess coating material. The removed coating vehicle is recovered for subsequent reuse. The rotation of the coated article is carried out in a vapor zone containing vapors of the coating vehicle solvent.

This invention provides a substantial economic advantage over other known processes since it is completely automated, even coatings are applied over complex surfaces, production efficiency is enhanced due to the elimination of long draining periods and substantial quantities of coating vehicle are recovered for reuse, rather than being wasted as in other procedures.

An important feature of the present invention is the vapor zone spinning. Such a zone is particularly important when using elevated temperatures and nonflammable solvents, such as halogenated hydrocarbons.

Preferably, the vapor zone is maintained at a sufficiently high temperature so that there will be no appreciable condensation of vapors within the zone. In this manner, the solvent washing of the coated articles is prevented. In instances where a decorative wash effect is desired on the coated article, certain coating compositions effect such a result on lowering the temperature in the vapor zone to promote condensation of vapors on the article. It has been found that by carrying out the spinning of the coated article for removal of the excess coating material in a zone containing vapors of the solvent used in the coating composition, the formation of cobwebs, strings, or streamers of coating composition adhering to the coated article is prevented. In contrast, where the coated article is rotated in a zone which is substantially free of solvent vapors, the excess coating material as it is thrown off of the article during rotation may harden or solidify into streamers or threads which are frequently still attached to the article. Such strings or threads, of course, detract from the appearance of the article and must be removed in some manner, generally in a tedious and time-consuming hand operation.

Many convenient means may be used in effecting rotation of the coated article so as to obtain the desired removal of excess coating material. Such variations in rotation methods are illustrated in the drawings and are described in the explanations thereof. It is believed that other methods and apparatuses for effecting the desired rotation of the coated article will become apparent to those skilled in the art and the methods indicated are given only as exemplary of those which may be used.

The apparatus and modifications disclosed are constructed so as to reduce the possibility of coating composition being sprayed onto succeeding or preceding articles during the spinning operation. To accomplish this result, it is preferred that the articles be in a spaced relationship to each preceding and succeeding article so that only one article is in the spinning tank during the spinning operation. It is possible, however, to have more than one article in the spinning zone during the spinning operation provided proper shielding is used to keep the coating composition, which is thrown from the spinning article, from hitting preceding or succeeding articles. One way in which this can be accomplished is to provide a mechanically actuated shield such as a panel or a plurality of panels which close about the article to form a cylindrical or similar shield during the spinning operation. Another method is to have panels which drop or slide into place in front of and behind the article during the spinning operation. The preferred embodiment, however, utilizes separate chambers, enclosures or tanks to eliminate the problem of spraying.

The invention is described more fuly with reference to the acompanying drawings in which.

Figure 1:
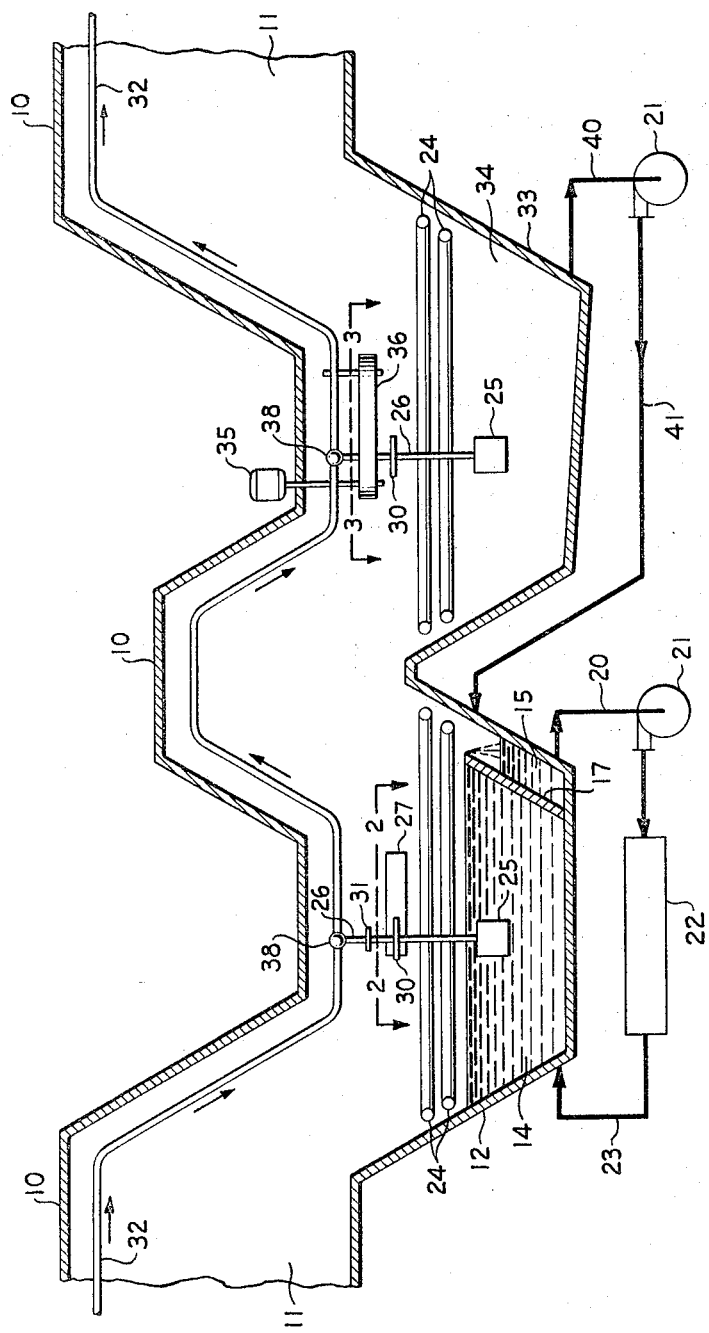
FIGURE 1 is a longitudinal sectional view of apparatus made in accordance with the present invention.

In the embodiment illustrated in FIGURE 1, the apparatus comprises a metal housing 10 which encloses the mechanisms of the system. Located in the center of passage 11 contained in housing 10 is a conveyor 32 used for movement of hangers 26 which are attached to the conveyor 32 in a spaced relationship by swivels 38. The conveyor 32 moves continuously at a predetermined speed from left to right moving the article 25 to be coated first to the coating tank 12 next to the spin tank 33 and finally out of the apparatus. While the article 25 is in the coating tank 12, it is slowly preferably rotated while submerged, sprayed or flooded with coating vehicle, to facilitate complete coverage throughout and within the integral complexities of the article 25.

Rotation is caused by a pinion 30 or other means located on the hanger 26 coming into contact with a toothed rack 27. The toothed rack 27 is stationary or alternately is moved back and forth being moved toward the oncoming hanger 26 to increase the rate of rotation, Also located on the hanger 26 is a pulley 31 which subsequently comes into contact with a drive belt 36 located above the spin tank 33.

As the coating operation is completed, the conveyor 32 quickly moves the article 25 into a physically separated chamber called the spin tank 33. The spin tank 33 has a solvent vapor atmosphere 34. Once positioned within the spin tank 33 the pulley 31 located on hanger 26 engages drive belt 36 which is powered by a motor 35. The engagement causes circular movement at a speed sufficient to release excess coating vehicle from the article 25 by centrifugal force. As the article 25 reaches the end of the spin tank 33, it is braked and conveyed out of the tank.

Conveyors 32, used in the apparatus of this invention are commercially available. There are many types which are suited for the present operation, the preferred being constructed of durable metal.

The coating tank 12, illustrated in FIG. 1, is a dip tank particularly suited for halogenated aliphatic hydrocarbon solvent-thinned coating vehicles but may also be a flow coating tank. Cooling coils 24 are located above and around the coating tank 12 to condense and retain the solvent vapors coming off of the coating vehicle solution. The condensate is directed through a water separator prior to returning to the coating mixture.

The coating tank 12, when used as a dip tank, has a wier 17 over which circulating coating vehicle 14 flows into a sump 15. Coating vehicle 14 is constantly withdrawn from the sump 15 by means of a pump 21 and drain line 21, then passed through a strainer and a heater 22 prior to returning to the coating tank 12 by means of the return line 23.

The spin tank 33 also has a drain line 40, a pump 21, and a return line 41 for return of excess coating vehicle to the sump 15 for recirculation. Positioned around the spin tank 33 are cooling coils 24 which retain solvent vapors 34 within the spin tank 33.

Figure 2:
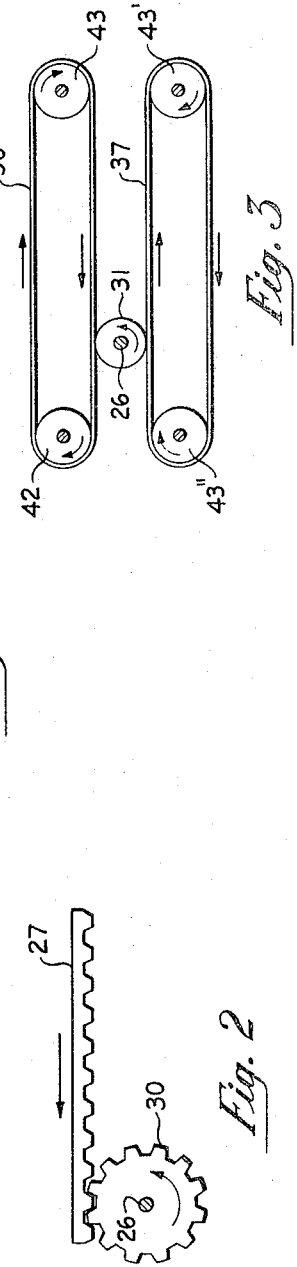
FIG. 2 is a partial plan view of the apparatus of FIG. 1 taken along 2—2, illustrating a means of effecting rotation.
Figure 4:
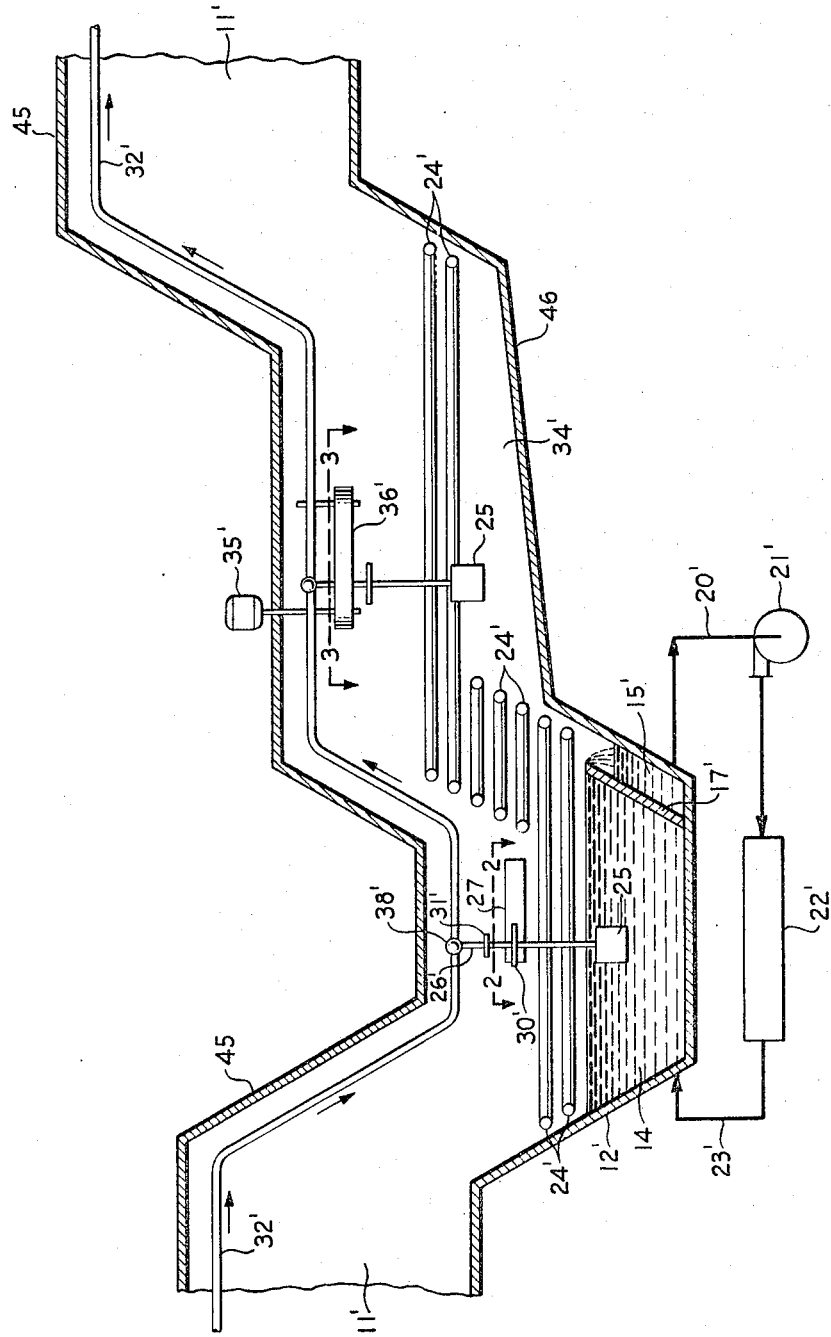
FIG. 4 is a longitudinal sectional view of a modification of the apparatus made in accordance with the present invention.

FIGURE 2 is a plan view along 2—2 of FIG. 1 and FIG. 4 illustrating one means of causing rotation. As the article enters the coating tank the pinion 30 fixed to the hanger 26 engages a toothed bar or rack 27. The rack 27 is stationary or alternately is moved toward the oncoming pinion 30 to increase the speed of rotation, and then back to starting position. In most instances, rack 27 may be stationary.

Other means of causing rotation are equally effective. Individual electric motors, vacuum or air pressure motors can be positioned on each hanger and initiated at the proper time by a contact switch causing rotation at the desired speed. The same or a similar motor could then be used to rotate the article in the spin tank at a higher rotational speed by action of another initiating switch.

Figure 3:
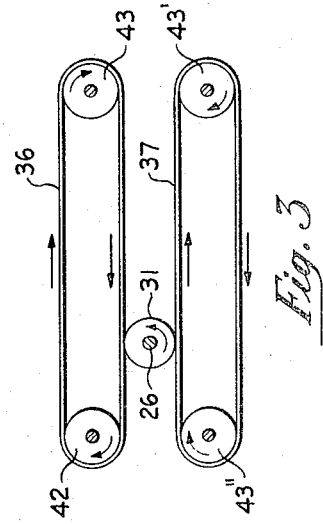
FIG. 3 is another partial plan view of the apparatus of FIG. 1 taken along 3—3, illustrating a spinning means.

FIG. 3 is a top plan view along the line 3—3 of FIG. 1 and FIG. 4 illustrating another means of causing rotation. This device is particularly applicable for causing rotation in the spin tank as shown in FIG. 1. It may also be used in the coating tank. Pulley 31 fixed to hanger 26 becomes positioned between drive belt 36 and friction belt 37 on entering the spin tank. The drive belt 36 is powered at the desired speed by a motor which drives the power wheel 42. The drive belt turns freely on wheel 43. Friction belt 37 is a free moving band which rotates about wheels 43′ and 43″ while holding pulley 31 firmly against drive belt 36. Alternately, more than one of wheels 43 could be powered as well as both belts 36 and 37.

FIGURE 4 is a longitudinal sectional view of a modification of the apparatus of this invention. In this modification, the apparatus has an alternate housing 45 but contains a similar conveying system 32′ which follows a somewhat different route. This modification has a similar coating tank 12′ containing a coating means for flow coating or dip coating (illustrated) and uses similar hangers having means for causing rotation such as pinion 30′ and pulley 31′, which respectively engage rack 27′ and drive belt 36′. Alternate means of rotation such as individual motors with appropriate initiators may also be used.

The coating tank 12′ functions in the same manner as coating tank 12 of FIG. 1. The difference in this modification is in the spin tank 46.

The particular advantage of this modification is the elimination of a pumping means and a return line for returning the excess coating vehicle from spin tank 46 to the coating tank 12′. The alternate spin tank 46 is sloped so as to return the excess coating vehicle removed from article 25 back to slump 15' by gravity. Again the spinning of article 25 in spin tank 46 is carried out in the same manner as described with respect to FIGURE 1. A solvent-vapor atmosphere 34' is maintained in spin tank 46 by positioning cooling coils 24' above the level of the spinning article 25.

Figure 5:
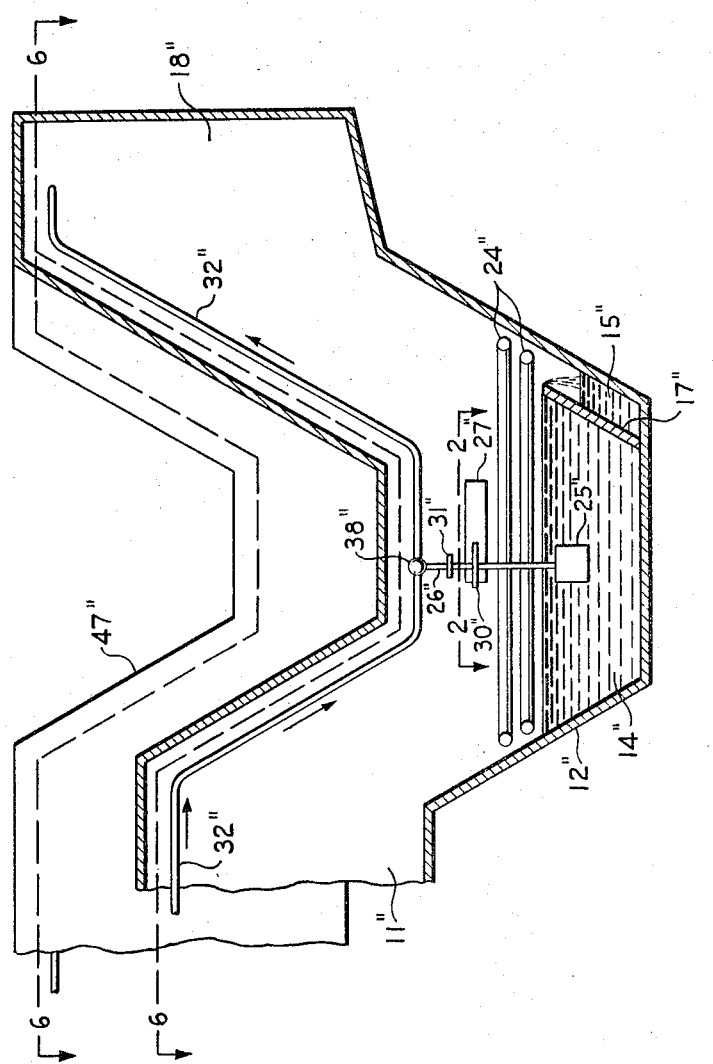
FIG. 5 is a longitudinal sectional view of another modification of the apparatus of this invention.
Figure 6:
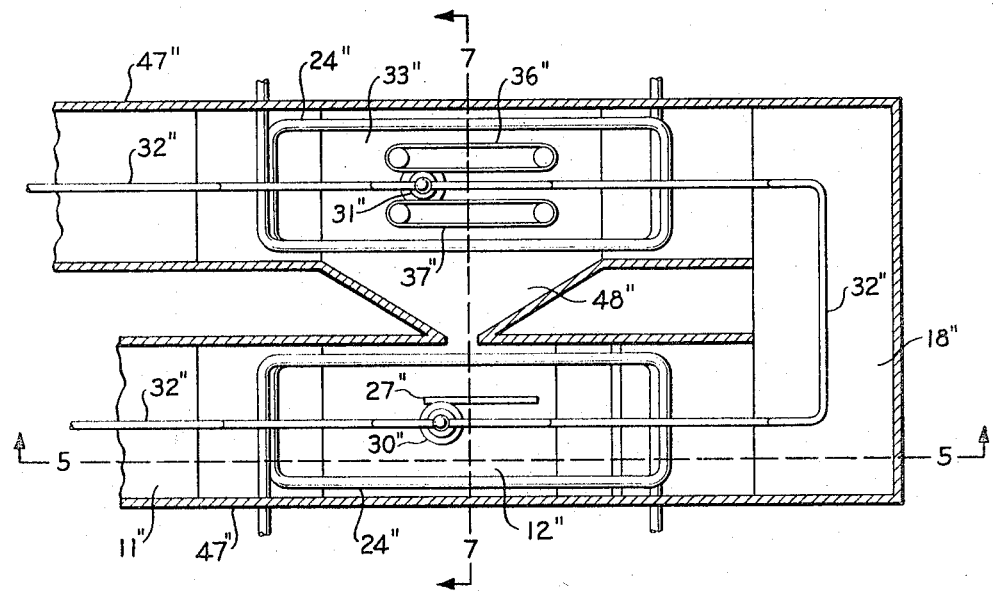
FIG. 6 is a plan view of the apparatus of FIG. 5 taken along 6—6.

FIG. 5 is a longitudinal sectional view of another modification of the apparatus of this invention viewed along 5—5 of FIG. 6. This modification is a space saving arrangement and includes means for protecting preceding and succeeding articels 25" from being sprayed by the excess coating vehicle being released from the spinning article in the spin tank.

The conveying system 32" and coating tank 12" are similar to those previously described in FIGURES 1 and 4. Hanger 26" and means of causing rotation are also similar to those previously described. The primary modification is in the location of the spin tank 33". The spin tank 33" is constructed similar to that illustrated in FIGURE 1. However, it is located in a position parallel to the coating tank 12". Thus, the conveyor 32" upon leaving the coating tank 12" rises sharply in a 90° turn, travels through passage 18, and turns another 90°, prior to positioning the article in the spin tank 33". The spray caused by the rotation of article 25" in the spin tank is thus confined to a limited area, eliminating the danger of splattering preceding and succeeding articles with coating vehicle.

In FIG. 6, conveyor 32" is positioned at the top and in the center of the passage 11" contained in the housing 47". Cooling coils 24" surround the coating tank 12" above the liquid level and also surround the spin tank 33" creating an upper limit of the solvent-vapor atmosphere. The pinion 30" and rack 27" are parts of the rotating means in the coating tank 12" and are similar to that of FIG. 2. The spinning means shown in the spin tank 33", include pulley 31", drive belt 36" and friction belt 37". This apparatus is similar to that shown in FIG. 3. Attached to the spin tank 33" is a gravity return 48" through which excess coating vehicle flows back to the coating tank 12". The coating tank 12" and the lower end of the gravity return 48" have a common liquid level. The passage 18" has a sloped bottom which causes drippings to flow back into either the sump 15" or the span tank 33".

Figure 7:
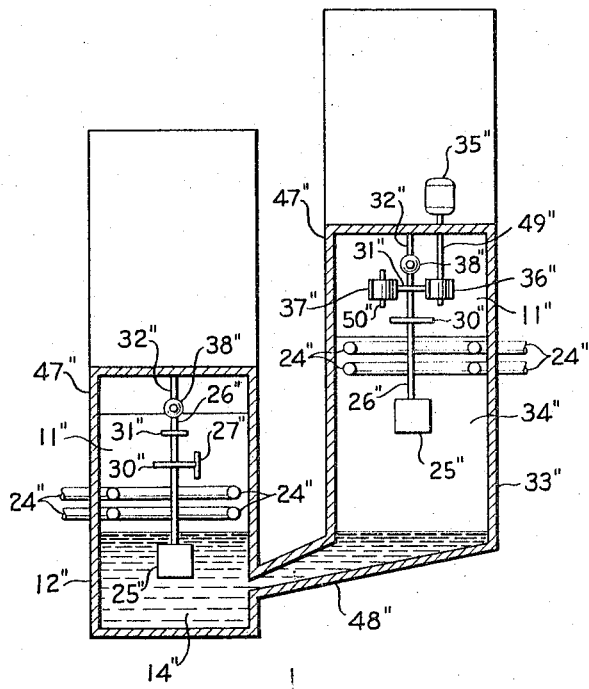
FIG. 7 is a transverse sectional view of the apparatus of FIGS. 5 and 6 along 7—7.

FIG. 7 is a transverse sectional view of the apparatus of FIGS. 5 and 6 along 7—7 in FIG. 6. This view shows the coating tank 12" as a dip tank filled with coating vehicle 14". Cooling coils 24" are positioned just above the the liquid level. The passage 11", contained in housing 47", and conveyor 32", to which hanger 26" is attached by means of swivel 38", are shown in the left portion of the figure. Fixed to hanger 26" is pulley 31" and pinion 30" which contacts rack 27". Hanger 26" carries article 25" through the coating apparatus. To the right of the coating tank 12" is spin tank 33" also containing cooling coils 24" which define the upper limit of the solvent vapor atmosphere 34". The bottom of the spin tank 33" has a common liquid level with the coating tank 12" thus permitting excess coating vehicle to flow back to the coating tank 12". The spinning means located in passage 11" comprises a motor 35", having a drive shaft 49", which powers drive belt 36" and contacts pulley 31", fixed to hanger 26", on which article 25" is located. A friction belt 37", fastened by means axle 50" to housing 47", holds pulley 31" in contact with drive belt 36". Also shown are the conveyor 32" swivel 38" and pinion 30".

The apparatus and modifications thereof disclosed herein are particularly applicable to large scale commercial production of coated articles. These apparatuses may be used as an integral part of a degreasing and phosphatizing system including a final curing chamber or oven. Such a system would conduct the article being coated through a degreaser, to a phosphatizing bath, to the apparatus of this invention and finally to a curing oven. In an automated continuous system, the article is conveyed rapidly through each step in a continuous manner. Particularly when using a thermosetting coating composition, the coated articles are passed through a curing oven maintained at a temperature of 100 degree centigrade to about 250 degrees centigrade to effect a final cure.

The coating compositions used may be solids or liquids on a 100 percent non-volatile basis but are thinned with sufficient solvent prior to use so as to form low viscosity liquids.

The preferred coating techniques used are flow coating and dip coating. Spray coating could be used but is less preferred. Dip coating and flow coating normally provide more complete coverage of the intricate surface configurations of the articles coated by means of the present apparatus. With such articles, the use of coating compositions in low viscosity liquid form generally insures substantially complete coverage of the entire surface area. However, the above statement of the preferred coating techniques is not meant to indicate that spray coating techniques, for instance, may not be used. Spray coating can be used but this may require spraying greater amounts of the coating composition on the article to obtain the desired coverage. Inasmuch as this is generally uneconomical, spray coating techniques will generally not be used with the apparatus of this invention.

The temperature of the coating composition is maintained between 20 degrees centigrade and 146 degrees centigrade. When using trichloro-ethylene, the preferred temperature range is 65 degrees centigrade to 88 degress centigrade. The temperature in the spin tank will be about the same as that of the coating vehicle.

The coating composition will have a viscosity at the operating temperature ranging from a No. 1 Zahn cup viscosity of about 15 seconds up to about 45 seconds. The preferred viscosity at an operating temperature of 76.7 degrees centigrade is a No. 1 Zahn viscosity of 15 seconds to 20 seconds.

Once the coating operation has been completed, and the articles have been coated to the extent desired, they are removed from contact with the coating composition and are maintained in a vapor zone containing vapors of the solvent substituent of the coating composition, such as trichloroethylene. Within this vapor zone, the coated articles are rotated at a peripheral speed and in a direction sufficient to effect removal of excess coating composition from the article. More specifically, the speed of rotation will be such that sufficient centrifugal force is produced to remove excess coating material, such as paint, from the surface of the article which has been coated. By excess coating material is meant that portion of the coating material on the article over and above that needed to provide a substantially uniform coating of the desired thickness. In some instances, as for example where the surface of the coated article is substantially smooth and flat, the excess coating material may be thought of as that which would normally run or drip off of the article if the article were maintained substantially motionless during air drying.

The speed at which the article will be rotated in order to remove the excess coating material may, of course, be varied, depending upon the mass of the article and the viscosity of the coating composition. For example, where the part being coated is relatively large, such as an automobile radiator, and/or the viscosity of the coating composition is relatively low, speeds of rotation such as 20 to 30 revolutions per minute may be sufficient. With smaller articles, such as fractional horse power motor stators and/or a high viscosity coating composition, higher speeds of rotation, such as 400 to 500 revolutions per minute, may be desired. The speed in r.p.m is sufficient to produce a peripheral speed of about one inch per second up to about 100 feet per second. The rotation is maintained for a period of time ranging from about one second up to about five minutes. The rotation of the article in the coating tank is slower than that in the spin tank. The peripheral speed induced in the coating tank will vary from about one foot per minute up to about 500 feet per minute. It is believed that in each instance, those in the art will readily be able to determine the rotational speed which should be used in order to obtain the desired removal of the excess coating composition and the apparatus of this invention is readily adjustable to various speeds.

The following examples are given to illustrate the methods and apparatus of this invention. The apparatus used was of the type illustrated in FIG. 1, having a coating tank capacity of 30 gallons.

While there have been described various embodiments of the invention, and elements described are not intended to be understood as limiting the scope of the invention, as it is realized that changes therewithin are possible, and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A coating apparatus, suitable for coating articles with a liquid coating composition comprising film-forming ingredients and a halogenated hydrocarbon solvent, which apparatus comprises (1) a coating tank, said coating tank having means for rotating articles being coated while in said coating tank, (2) a spin-enclosure, physically separated from said coating tank, the bottom of said spin enclosure formed integral with an intermediate sidewall section of the coating tank whereby to communicate therewith and to maintain a common fluid body, said spin-enclosure having means for maintaining a solvent vapor atmosphere therein and means for spinning coated articles in said solvent vapor atmosphere at a peripheral speed sufficient to remove substantially all excess coating material therefrom, and (3) conveying means for moving articles to and from said coating tank and said spin-enclosure.

2. The apparatus of claim 1 wherein the coating tank is a dip tank.

3. The apparatus of claim 1 having means for heating said liquid coating composition to a temperature up to 88 degrees centigrade.

4. The apparatus of claim 1 wherein the means for causing rotation is a variable speed motor.

5. The apparatus of claim 1 wherein the means for causing rotation is a pinion contacting and moving along a toothed rack.

6. The apparatus of claim 1 wherein the means for causing rotation is a pulley contacting a powered drive belt.

References Cited by the Examiner

UNITED STATES PATENTS

| | | | |
|---|---|---|---|
| 783,199 | 2/1905 | Heinz | 118—54 |
| 1,185,329 | 5/1916 | Janisch | 118—56 |
| 1,770,620 | 7/1930 | Mann | 118—56 |
| 1,977,704 | 10/1934 | Vaughan et al. | 118—54 |
| 2,554,803 | 5/1951 | Wysocki | 118—610 |
| 2,560,270 | 7/1951 | Bird | 118—57 |
| 2,739,567 | 3/1956 | Jones et al. | 118—602 X |
| 2,755,205 | 7/1956 | Robb et al. | 118—56 X |
| 2,930,349 | 3/1960 | Jones | 118—602 |
| 3,146,873 | 9/1964 | Johnson | 118—56 X |

FOREIGN PATENTS 732,771   6/1955   Great Britain.

MORRIS KAPLAN, *Primary Examiner.*